United States Patent [19]

Hampton et al.

[11] Patent Number: 4,460,993
[45] Date of Patent: Jul. 17, 1984

[54] AUTOMATIC FRAMING IN TIME DIVISION MULTIPLEXER

[75] Inventors: Dean A. Hampton, Watertown; David A. Lambert, New Fairfield, both of Conn.

[73] Assignee: General DataComm Industries Inc., Danbury, Conn.

[21] Appl. No.: 224,339

[22] Filed: Jan. 12, 1981

[51] Int. Cl.³ .............................................. H04J 3/16
[52] U.S. Cl. ........................................ 370/84; 370/99; 364/900
[58] Field of Search ................ 370/82, 83, 84, 99, 370/94, 112; 364/200 MS File, 900 MS File

[56] References Cited

U.S. PATENT DOCUMENTS

| | | | |
|---|---|---|---|
| 3,497,627 | 2/1972 | Blasbalg et al. | 370/84 |
| 3,700,820 | 10/1972 | Blasbalg et al. | 370/84 |
| 3,804,987 | 4/1974 | Cooper | 370/99 |
| 3,959,595 | 5/1976 | Smith | 370/84 |
| 3,970,798 | 7/1976 | Epenoy et al. | 370/83 |
| 3,988,545 | 10/1976 | Kuemmerle et al. | 370/99 |
| 4,082,922 | 4/1978 | Chu | 370/83 |
| 4,160,128 | 7/1979 | Texier | 370/84 |
| 4,313,193 | 1/1982 | Nakano et al. | 370/112 |
| 4,322,844 | 3/1982 | Fellinger et al. | 370/94 |

Primary Examiner—Robert L. Griffin
Assistant Examiner—Stephen Chin
Attorney, Agent, or Firm—Pennie & Edmonds

[57] ABSTRACT

A method and apparatus are described for automatically generating the frame that is used in a bit-interleaved time division multiplexer (TDM). The apparatus comprises a microprocessor, two random access memories in which are stored the channel select signals, device for determining the transmission frequencies of each channel and a computer program which is stored in the memory of the computer for calculating the distribution of the channel select signals in the frame. With such a system, the frame can be reconfigured in about thirty seconds. Two random access memories are preferably used for the storage of the channel select signals. While the signals stored in one memory are being used to generate the actual frame, a new set of channel select signals can be stored in the other memory. After such an updated frame is written in the second memory, the task of generating the channel select signals can be switched from the first memory to the second memory without loss of any data from any of the data channels.

15 Claims, 6 Drawing Figures

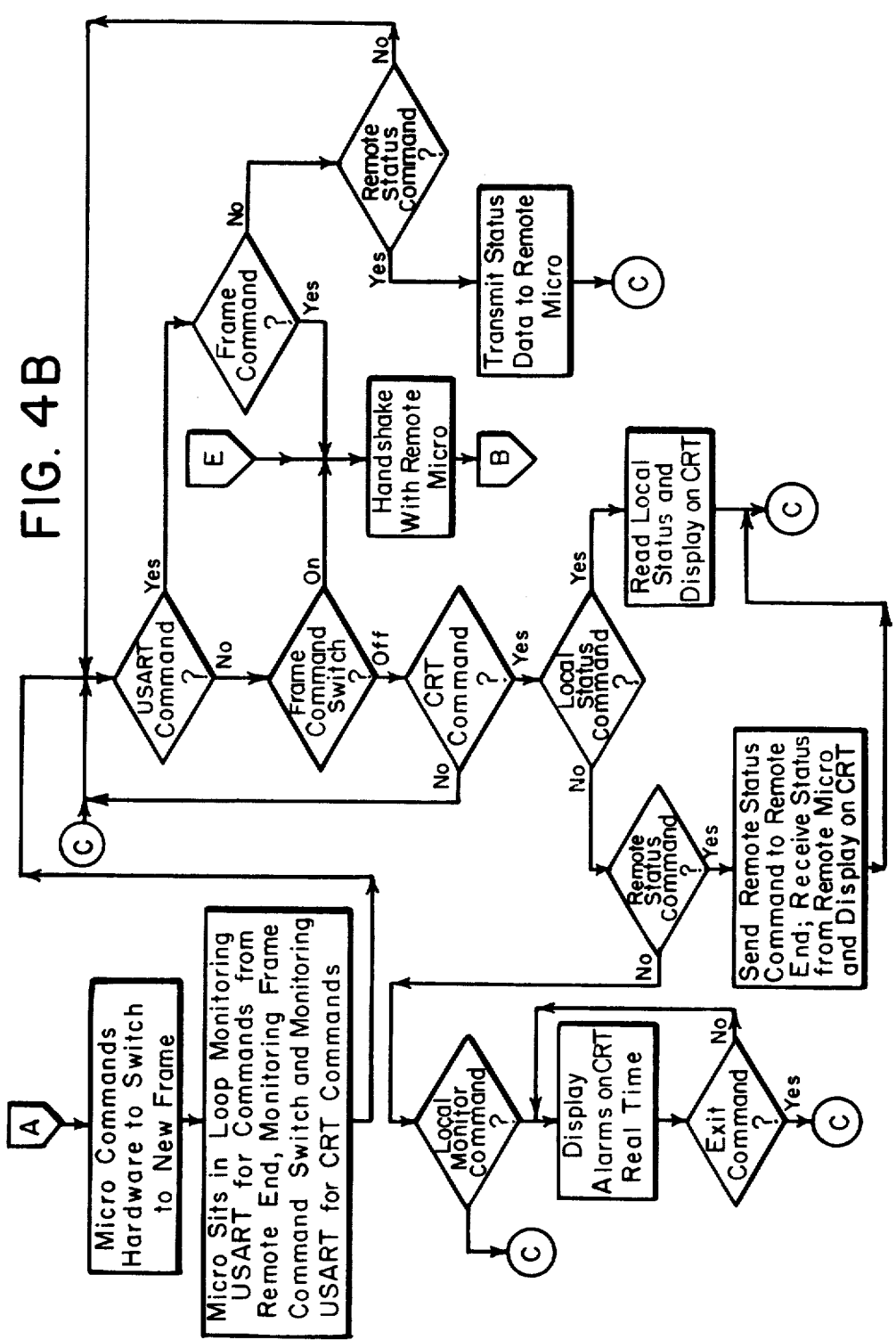

AUTOMATIC FRAMING IN TIME DIVISION MULTIPLEXER

CROSS REFERENCE TO RELATED APPLICATIONS

This application is related to the following concurrently filed applications: "Method and Apparatus for Interleaving Control Signals", Ser. No. 244,337; "Method and Apparatus for Establishing Frame Synchronization", Ser. No. 224,338; "Method and Apparatus for Overhead Signaling", Ser. No. 224,335; and "Method and Apparatus for Distributing Control Signals", Ser. No. 224,340. Each of these applications is assigned to General DataComm Industries, Inc. and is incorporated herein by reference.

TECHNICAL FIELD

This relates to a method and apparatus for operating a time division multiplexer (TDM) system and in particular, to a method and apparatus for generating the frame used in such a system.

BACKGROUND ART

In a typical TDM system, a transmitter samples pulse signals of relatively low pulse repetition frequency from various data sources or channels and interleaves them with one another to form an aggregate data stream that is transmitted by a high speed aggregate channel to a remote receiver. Ordinarily, the TDM transmitter inserts the signals representative of a single bit or a single character in a single time slot in the aggregate data stream and interleaves the signals from different channels on a bit-by-bit or character-by-character basis so that adjacent time slots contain signals from different channels. However, different size blocks of signals can be used if desired. At the receiver, the individual bits or characters are separated from one another and allocated to various low frequency data channels similar to those at the transmitter.

To permit proper decoding of the data stream at the receiver, the transmitter interleaves the signals from the various data channels in accordance with a fixed schedule which it repeats endlessly and the receiver uses the same schedule to decode the data stream. Each cycle of the schedule is called a frame or an aggregate frame. In addition to data signals, each frame ordinarily inclues synchronization signals called frame sync words and various control signals, both for individual channels and for the entire TDM system. Typically, the synchronization and control signals take up a small portion (less than 5%) of the total frame which is referred to as the overhead. To simplify the generation of the signals used to select the particular data channel from which a bit or character is to be transmitted, it is customary to sample the data channels in a fixed pattern which is repeated numerous times within each frame. Each such cycle of repetition is called a subframe.

In the prior art the frame is typically designed manually at the time the TDM system is installed. The data rates of the different channels are determined and from this information a channel sampling pattern is devised which will permit each channel to be sampled as often as is required to permit the data from the different channels to be interleaved without loss of any data.

The process of establishing a frame is complicated. Every channel has to be sampled at least once in every frame and as often as required to assure that all the data from the channel is interleaved in the aggregate data stream. In addition, a set of overhead signals must be transmitted for each frame. If the data transmission system is subject to varying loads, numerous design choices will be apparent. If the system is designed so that the data transmission rate of the aggregate channel is equal to the sum of the transmission rates of the individual channels and overhead, there will be unused system capacity during off-peak periods. On the other hand, if the aggregate channel rate is less than the sum of the individual channel rates, restrictions will have to be imposed on the use of the individual channels.

Since every channel has to be sampled at least once in every frame, the speed of the slowest channel in the frame determines the maximum number of frames that can be transmitted per unit time without wasting the bandwidth of the aggregate channel. In addition, since the overhead signals transmitted in each frame are approximately the same regardless of the length of the frame, there is considerable incentive to use every long frames in order to decrease the overhead and increase data transmission. The result is that frames tend to be quite long and in a bit interleaved system a frame may consist of several thousand time slots.

Because of the efforts involved in creating a frame of such size and the difficulty involved in reconfiguring a conventional TDM system, there is considerable economic incentive both to overdesign the system and to delay needed reconfiguration. In particular, where data channels may have different data rates at different times and some channels may not even be used, the tendency is to design the system and the frame to accommodate the maximum data rate from all channels even though this results in under-utilization of the aggregate channel. Moreover, when circumstances change and it becomes desirable to alter the data rate of one or more channels from that for which the frame was designed, the system operator is inclined to get along with the old frame because the costs and delays of reconfiguring the system exceed whatever gain in data transmission might be achieved by such reconfiguration. For example, reconfiguration usually is performed by the manufacturer of the system at a site removed from that of the transmission system. Several weeks usually are required to effect such a reconfiguration.

As will be apparent, these problems become particularly acute where the multiplexing system is subject to constant change in the demand for channel capacity. These problems will be noticeable in any activity which is cyclic in nature and are likely to become more pronounced as businesses increase their reliance on computer systems.

DISCLOSURE OF THE INVENTION

We have devised a method and apparatus of automatically generating the frame that is used in a bit-interleaved time division multiplexer (TDM). In accordance with our invention, the apparatus comprises a microprocessor, two random access memories in which are stored the channel select signals, means for determining the transmission frequencies of each channel and a computer program which is stored in the memory of the computer for calculating the distribution of the channel select signals in the frame. With such a system, the frame can be reconfigured in about thirty seconds.

In accordance with our invention, the frame can be reconfigured every time there is a change in the data rate on a channel. As a practical matter, it appears to be advantageous to perform such reconfiguration as frequently as once a week. In some situations where there are dramatic shifts in the load on the system, it may be advantageous to perform such reconfiguration on a daily or even hourly basis as such shifts occur. As a result, despite such changes in the data rate of individual channels, the system can always be operated relatively close to its optimum data transmission rate.

Further, in accordance with our invention two random access memories are used for the storage of the channel select signals. While the signals stored in one memory are being used to generate the actual frame, a new set of channel select signals can be stored in the other memory. After such an updated frame is written in the second memory, the task of generating the channel select signals can be switched from the first memory to the second memory without loss of any data from any of the data channels.

BRIEF DESCRIPTION OF THE DRAWINGS

These and other objects, features, elements and advantages of our invention will be more readily apparent from the following description of the best mode for carrying out the invention in which:

FIGS. 4A, 4B and 4C are flow charts illustrating the major steps involved in practicing our invention.

BEST MODE FOR CARRYING OUT THE INVENTION

Figure 1:
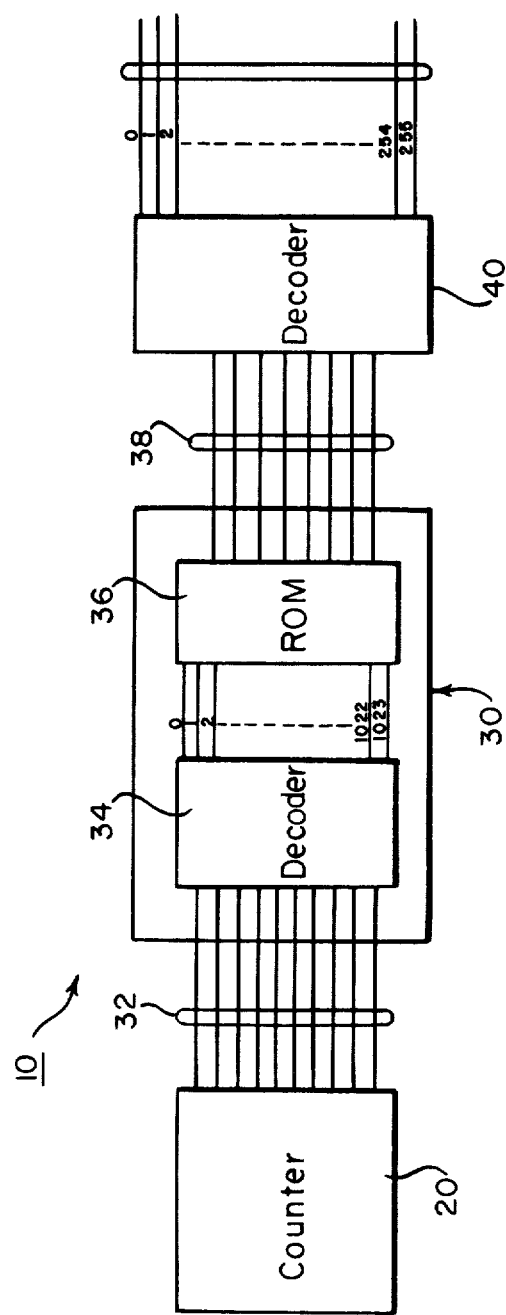
FIG. 1 is a block diagram depicting an illustrative embodiment of a frame generator of the prior art.
Figure 2:
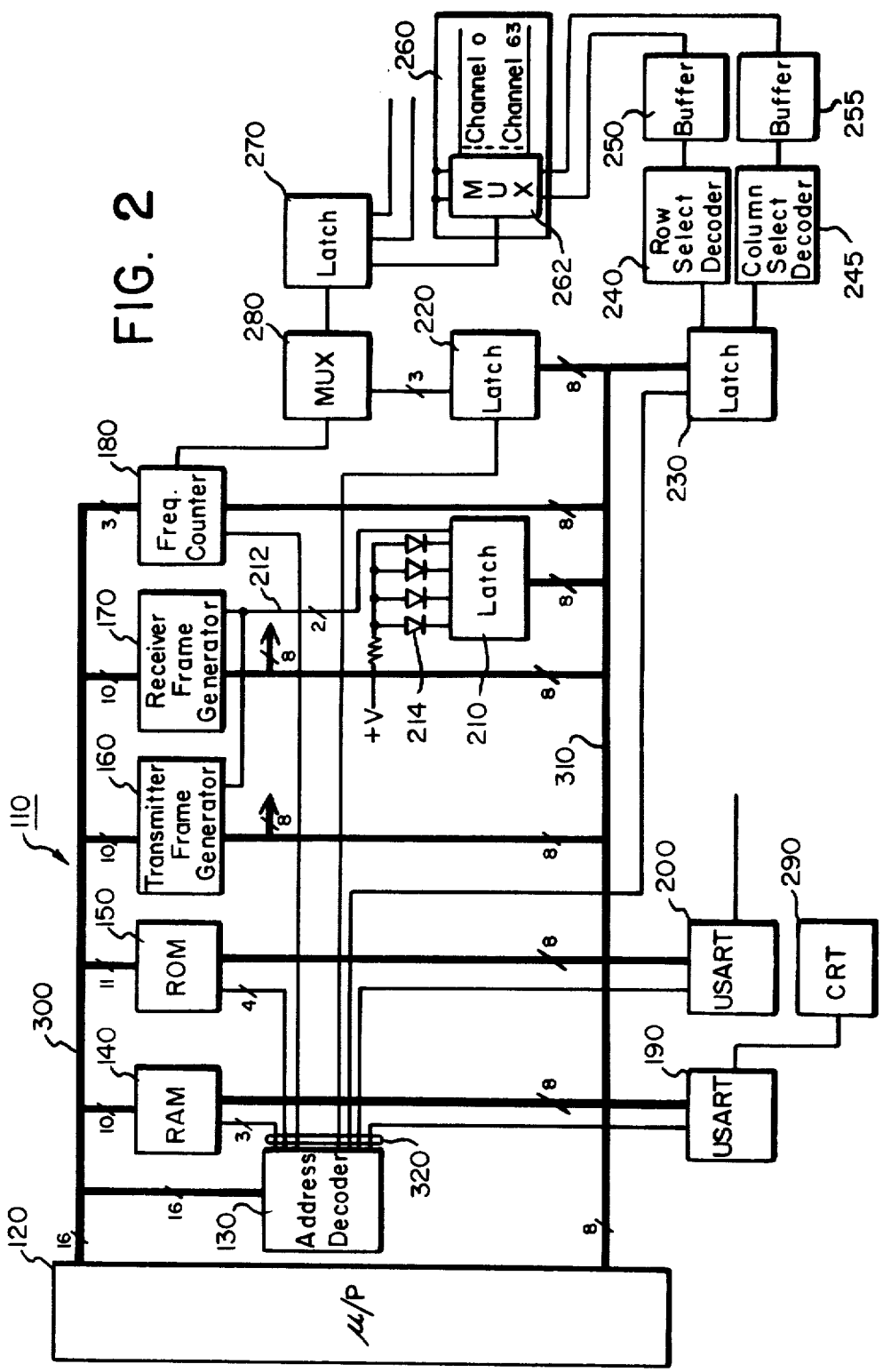
FIG. 2 is a block diagram of an illustrative embodiment of the invention.
Figure 3:
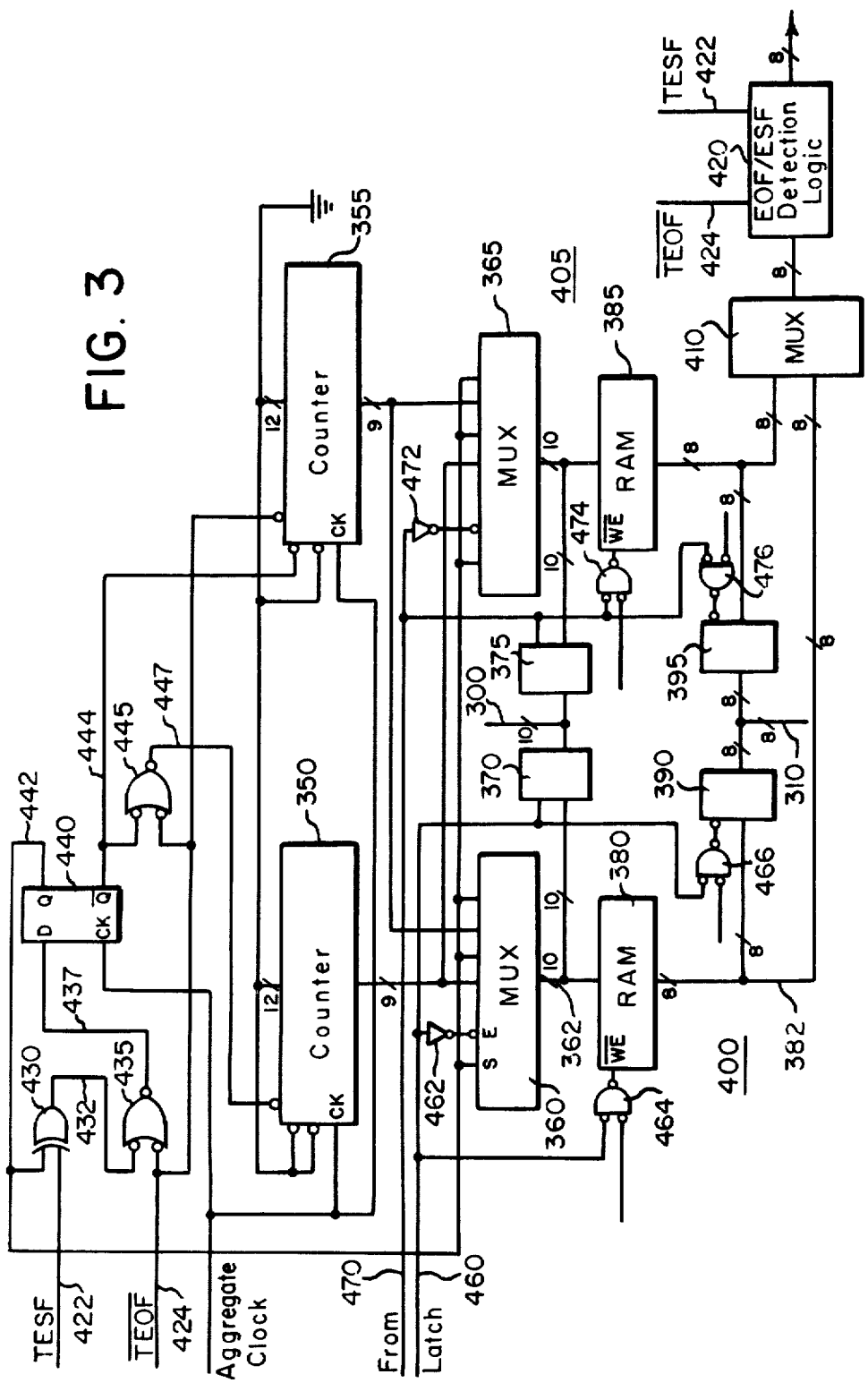
FIG. 3 is a block diagram of a detail of the illustrative embodiment of FIG. 2.

Simplified block diagrams of an illustrative TDM system, a TDM transmitter and a TDM receiver are set forth in FIGS. 1, 2 and 3 respectively, of U.S. Pat. No. 3,632,882 for "Synchronous Programmable Mixed Format Time Division Multiplexer," which is incorporated herein by reference. As shown therein, a plurality of pulse data sources or channels A-X are connected by transmitter multiplexer 100 in time-division multiplex format via a conventional transmission system 101 to a receiver demultiplexer 102 where the interleaved data signals are separated and delivered to appropriate data sinks A-X. Since the pulse repetition rate and the number of bits per character may differ from one source to the next, the data from each source is advantageously stored in a separate buffer register prior to transmission. Data stored in each such register is shifted out by a channel shift clock signal that is applied to the register under control of a channel select signal; and the data signals from the registers are combined by OR gate 210 to produce a composite data signal. Thus the channel select signals determine the particular time slots in the composite data signal which are occupied by data from each channel. In similar fashion at the demultiplexer, channel select signals are supplied to AND gates 300A-300X and to AND gates 301A-301X to select the particular channel into which the shift clock signal shifts the data located at a particular time slot in the composite data signal. As will be apparent, each station in a TDM system usually comprises both a transmitter and a receiver for two way communication between the stations of the system.

Appropriate channel select signals for the transmitter and the receiver may be generated in many ways. For example, the channel select signals may be stored in a programmable read only memory and the signals may be read out by accessing the individual addresses of the memory serially using a binary counter. Thus, as shown in FIG. 1, a frame generator 10 might comprise a recycling binary counter 20, a memory 30 and a decoder 40. The memory might be a 1KX8 bit memory with ten parallel input lines 32, a 10-line-to-1024 line decoder 34, a read only memory matrix 36 having 1,024 address lines to memory locations which are addressed one at a time and eight parallel binary output lines 38. When the memory is enabled, the signal on the ten input lines is decoded to activate a single address line to the memory matrix. This produces a binary output signal on the eight output lines in accordance with the information stored at the address in the memory matrix. These output lines are then applied to decoder 40 which converts a parallel binary signal on its eight input lines to an output on one of as many as 256 output lines. Of these output lines, some are channel select lines which are used to enable channel select gates in a multiplexer. Such gates are shown as elements 200A-200Z and 201A-201Z in the transmitter multiplexer 100 depicted in FIG. 2 of the U.S. Pat. No. 3,632,882 and elements 300A-300X and 301A-301X in receiver multiplexer 102 of FIG. 3 of that patent. Other output lines are available to enable gates for control and synchronization signaling.

The frame generator of FIG. 1 is typically programmed at the time the TDM is installed and remains in operation until the system is replaced. As a result, the individual data channels and the system are typically over designed with more aggregate channel capacity than is needed for normal use of the system; and after the demand for the system has increased, the system typically is unable to satisfy all the demand there is. Nevertheless, because of the costs of reconfiguring the frame, the system's users simply have to get by with what they have.

FIG. 2 depicts an illustrative embodiment of a microcomputer 110 which permits the frame to be reconfigured whenever there is a change in the system. This illustrative embodiment comprises a microprocessor 120, an address decoder 130, 3K of random access memory (RAM) 140, 8K of read only memory (ROM) 150, a transmitter frame generator 160, a receiver frame generator 170, and a frequency counter 180. Further, the apparatus comprises first and second universal synchronous/asynchronous receiver/transmitters 190, 200, latches 210, 220, 230, row select and column select decoders 240, 245, buffers 250, 255, a clock signal source 260, a line receiver latch 270, a multiplexer 280, and a cathode ray tube (CRT) display 290. These elements are connected together as shown in FIG. 2 by an address bus 300 and a data bus 310. In addition, the operation of the individual components of the circuit are controlled by control signal lines 320 from address decoder 130. One unit of apparatus 110 is present in each TDM transister/receiver in the system.

Microprocessor 120 is illustratively a Motorola 6809. Address decoder 130, RAM 140, and ROM 150 are conventional and may be implemented in numerous ways. In the particular configuration shown, RAM 140 comprises six 1KX4 bit units of 2114-type random access memory. Pairs of these units are addressed in parallel by ten address lines in order to produce an eight bit parallel output. ROM 150 comprises four 2KX8 bit units of 2716-type memory. Each of these units is addressed by eleven address lines to produce eight parallel bits of output.

Frequency counter 180 is a Motorola 6840 chip which calculates the frequency of the signal supplied from multiplexer 280 and supplies this information to microprocessor 120 via data bus 310. The signals supplied to multiplexer 280 are derived from the clock signals on the individual data channels as well as the aggregate clocks for the aggregate transmitting and receiving channels of the TDM. Illustratively, multiplexer 280 is an 151-type multiplexer which supplies one out of as many as eight input signals to an output line in accordance with an address supplied to it by three control lines. The address is provided to multiplexer 280 on three lines from latch 220. Signals on these lines are supplied to latch 220 by three of the lines in data bus 310.

The clock signals on the individual data channels are schematically represented in FIG. 2 by clock signal source 260. Individual channels in clock signal source 260 are addressed by latch 230, decoders 240, 245 and buffers 250, 255. The address of an individual channel to be accessed is supplied by microprocessor 120 to latch 230 via data bus 310. Three bits of this address are selected by row decoder 240 to produce a signal on one of eight lines which is supplied through buffer 250 to a multiplexer 262 in clock signal source 260. Three more bits are supplied to column select decoder 245 to produce a signal on one of eight lines which are applied through buffer 255 to multiplexer 262. As a result of this arrangement, the microprocessor may access any one of up to 64 channels in the clock signal source to read the clock signal of that channel into line receiver latch 270. The aggregate clock signals for the TDM transmitter and the TDM receiver are also provided to line receiver latch 270. Signals from line receiver latch 270 are multiplexed by multiplexer 280 so as to select one of these signals for application to frequency counter 180. Illustratively, latch 230 is a 374-type octal D-type flip-flop. Decoders 240, 245 are 138-type one-of-eight decoder/demultiplexers and buffers 250, 255 are 244-type buffers. Multiplexer 262 is similar to that shown in the '882 patent incorporated herein by reference.

USARTs 190, 200 are 8251-type integrated circuits which convert the parallel signals on data bus 310 to serial signals on output lines 192, 202. USART 190 provides the interface to CRT display 290. USART 200 provides an interface between automatic framing apparatus 110 and the aggregate channel which permits signals to be transmitted between the automatic framing apparatus 110 at a local station and similar apparatus at a remote station.

Latch 210 stores signals supplied from the microprocessor via data bus 310. Several of these signals are used to control light emitting diodes 214 which warn the operator of various errors in the operation of the system. Two of these signals are applied via line 212 to the transmitter and receiver frame generators 160, 170.

FIG. 3 depicts an illustrative embodiment of a frame generator which can be used either as the transmitter frame generator 160 or the receiver frame generator 170 in the practice of the invention. The frame generator comprises first and second counters 350, 355, first and second multiplexers 360, 365, first and second address buffers 370, 375, first and second random access memories (RAM) 380, 385, first and second data buffers 390, 395, a multiplexer 410 and EOF/ESF detection logic 420. Further, the apparatus comprises an exclusive OR gate 430, an AND gate 435, a D-type flip-flop 440 and a second AND gate 445 for control of counters 350, 355. Multiplexer 360, address buffer 370, RAM 380 and data buffer 390 constitute a first random access memory unit 400 and multiplexer 365, address buffer 375, RAM 385 and data buffer 395 constitute a second random access memory unit 405 identical to the first. These units are used alternately under control of multiplexer 410 to produce the channel select and overhead signals for the frame. In accordance with the invention, the unit that is not in use for generation of the frame select signals is available for rewriting the contents of the RAM that is a part thereof.

In conjunction with the memory to which they are connected, counters 350 and 355 and control logic 430-445 provide for the generation of a multiplicity of sub-frames as well as a small number of channel select and overhead signals that are generated once in the frame. The operation of these counters and control circuitry is analogous to the operation of counters 20 and 25 of U.S. Pat. No. 4,123,309 which is incorporated herein by reference. Counter 350 is a recycling counter, which in the embodiment shown may count as high as 512 counts before recycling. The output of the counter is applied through multiplexers 360 or 365 to address random access memories 380 or 385 in which are stored the channel select signals. In a typical frame, counter 350 may be cycled 100 or more times to read sequentially out of one of the random access memories the channel select signals stored therein at the addresses defined by the counter. Counter 355, which is analogous to counter 20 of the '309 patent, is cycled only once during the generation of an entire frame to read sequentially out of a different portion of the memory the channel select and overhead signals stored therein at the addresses defined by the counter. Both counters are reset at the end of the frame.

Illustratively, each of counters 350 and 355 comprises three 169-type four-bit synchronous counters, which are cascaded together through their carry look ahead circuitry. Each of multiplexers 360, 365 comprises three 157-type quad two-input multiplexers, two of which units have four inputs each from counters 310, 320 and the last of which has one input from each of these counters. A second input to the last of the three units is derived from latch 440. Buffers 370 and 375 are implemented using three 244-type buffers; and buffers 390, 395 are 245-type. Random access memories 380, 385 are each a pair of 1KX4 bit 2114-type memories. Multiplexer 410 is implemented in a pair of 157-type quad two-input multiplexers. EOF/ESF detection logic 420 is a network of gates and multiplexers having the logical function of detecting the signals representative of end of subframe (ESF) and end of frame (EOF). This detection logic produces the output signals $\overline{\text{TESF}}$ and $\overline{\text{TEOF}}$ which indicate the detection of the end of subframe bit and the absence of the end of frame bit, respectively.

When there is no ESF bit present, the signal on line 432 from exclusive OR gate 430 is low, causing the signal on line 437 from AND gate 435 to be low. If the Q output of flip-flop 440 on line 442 is not already low, it accordingly becomes low upon receipt of the next clock signal. Line 442 is also connected to the select input gate S of multiplexers 360, 365 and to the tenth input line of each of the dual inputs of these multiplexers. While the signal on line 442 from flip-flop 440 is low, the signal on line 444 from the $\overline{Q}$ output will be high thereby disabling counter 355 and enabling AND gate 445. In the absence of an EOF signal, the other input to AND gate 445 will also be high causing the signal on line 447 to be high. As a result, the signals applied to the load terminal L of counters 350 and 355 will both be high, thereby disabling the load function. At the same time, a low signal is applied to both enabling terminals of counter 350 thereby enabling this counter and causing it to advance by one upon the receipt of each clock pulse at the clock input.

Lines 460, 470 provide control signals from latch 210 which determine whether the RAMs are addressed by the multiplexer or the buffer. When the signal on line 460 is high, buffer 370 is disabled and, because of the inversion by inverter 462, multiplexer 360 is enabled. The high signal on line 460 is also applied through OR gate 464 to the $\overline{WE}$ terminal of RAM 380 and through OR gate 466 to the enable terminal of data buffer 390, thereby disabling buffer 390 and the write function of the memory. The signal on line 470 operates in the same fashion to control multiplexer 365, buffers 375, 395 and RAM 385.

When multiplexer 360 is enabled and the signal at its select input is low, the output of multiplexer 360 is the signal from counter 350. When the signal at its select input is high, the output is the signal from counter 355. As will be apparent, when the output from counter 350 is present on the address lines 362 from multiplexer 360, the signal on the tenth address line will be low since a low signal is present on the tenth input lines to the multiplexer. Conversely, when the output from counter 355 is present on address lines 362, the signal on the tenth line will be high.

The signals on address lines 362 address random access memory 380 to produce an eight bit parallel output signal on line 382 to multiplexer 410. In like fashion when the signal on line 470 is high, an eight bit parallel output signal is produced on line 387 from RAM 385 to multiplexer 410. In accordance with a control signal from the microprocessor, multiplexer 410 selects the signals from line 382 or 387 as the output signals to the TDM transmitter/receiver. These signals from multiplexer 410 provide the channel select signals and control signals that are used to select data from individual data channels for transmission through the multiplexing system or to route received data to the appropriate data channels. A typical application of these channel select signals is disclosed in detail in the above referenced application "Method and Apparatus for Interleaving Control Signals". Transmitter and receiver frame generators 160, 170 of the present invention can be substituted for transmitter frame generator 130 of FIG. 2 and receiver frame generator 570 of FIG. 7 of the referenced application.

Detection logic 420 monitors the signals from multiplexer 410 for those indicating the end of a subframe or the end of a frame. When detection logic 420 detects an ESF signal in the stream of signals from multiplexer 410, the TESF signal on line 422 goes high. As a result, the signal on line 432 from OR gate 430 likewise goes high. In the absence of an end of frame signal, this causes the signal on line 437 from AND gate 435 to go high and on the next clock signal, flip-flop 440 changes state.

When the Q output from flip-flop 440 goes high, the signal applied to the select input and the tenth address lines of multiplexer 330 and 340 goes high. At the same time, the $\overline{Q}$ output goes low, thereby enabling counter 355, disabling AND gate 445 and enabling the load terminal L of counter 350. Upon receipt of the next clock signal, counter 350 is reset to zero and counter 355 begins to count. Since the select input to multiplexer 360 is now high, the output of counter 355 is present in address lines 362 from multiplexer 360. In addition, the tenth output line from multiplexer 360 is now high since the tenth input lines to multiplexer 360 are also high. As a result, the signals on address lines 362 now address a different portion of random access memory 380 in which are stored a set of channel address signals and control signals which are transmitted only once during the entire frame.

When counter 355 advances to the point where it addresses that address in memory 370 that produces the next end of subframe signal, detection logic 420 again causes the output on line 422 to go high. Since the signal on line 442 at this time is also high, the signal on line 432 from exclusive OR gate 430 goes low causing the input to flip-flop 440 to go low. On the next clock signal, the Q output of flip-flop 440 goes low thereby causing the select inputs and the tenth address lines to multiplexers 360 and 365 to go low. At the same time, the $\overline{Q}$ output of flip-flop 440 goes high, thereby disabling counter 355 and enabling AND gate 445. This causes the output from AND gate 455 to go high, thereby disabling the load terminal of counter 350. Since counter 350 is enabled, upon receipt of the next clock signal the counter begins to count from zero once more; and since the select input of multiplexer 360 is now low, the signals from counter 350 are present in address lines 362 from multiplexer 360. Again, since the input on the tenth address lines to multiplexer 360 is low, the signal on the tenth address line to RAM 380 is likewise low; and the signals from counter 350 address the same portion of RAM as in the first cycle.

This process continues with control shifting back and forth between counters 350 and 355 in accordance with the detection of ESF signals by logic 420. When the EOF signal is finally addressed in RAM 380 and detected by logic 420, the signal on line 424 goes low. As a result, a low signal is produced on line 437 at the input to flip-flop 440 as well as on line 424 to the load terminal of counter 355 and line 447 to the load terminal of counter 350. These signals to the two load terminals cause both counters to be reset upon receipt of the next clock signal; and the apparatus of FIG. 3 is ready to generate the signals for the next frame.

In the prior art such as that described in the above referenced U.S. Pat. No. 4,123,309, the channel select signals are stored in a read only memory. In accordance with the present invention, memories 380, 385 are random access memories which permit different sets of channel select signals to be stored therein by microprocessor 110 so as to generate different frames. The individual channel select signals to be stored are supplied to random access memories 380, 385 by data bus 310 and data buffers 390, 395. The addresses at which the signals are to be stored in RAMs 380, 385 are supplied to the RAMs by address bus 300 and address buffers 370, 375. To write a channel select signal into RAM 380, a low signal is provided on line 460. This signal disables multiplexer 360 and enables buffer 370. This signal is also applied to OR gates 464, 466. When the other input to these OR gates is low, the output of these OR gates is also low thereby enabling buffer 390 and the write enable input to RAM 380. As a result, an eight bit signal stored in buffer 390 is stored in RAM 380 at the address defined by the ten bits stored in buffer 370. By addressing each one of the addresses in RAM 380, the microprocessor is able to store therein an array of channel select and control signals which define a new frame. In like fashion, a low signal on line 370 disables multiplexer 365, enables buffer 375 and provides low signals to OR gates 474, 476. When the other input to these OR gates is low, buffer 395 and the write enable input to RAM 385 are enabled.

First and second memory units 400, 405 are used in accordance with the invention to permit the TDM to continue to transmit or receive data while a new frame is being generated and stored in the random access memory. While the addresses generated by counters 350, 355 are being used to read channel select and overhead signals out of one memory unit, the address and data buffers of the other unit are being used to write a new set of channel select and overhead signals into the random access memory of that unit.

Once a new frame is stored in random access memory both in the local station and in the remote station, the system is ready to switch over from the old frame to the new frame. When the end of frame signal in the old frame is detected by logic 420, and the microprocessor is informed of this, the signal goes high on the enable line 460 or 470 to the multiplexer of the memory unit in which the new frame is stored. At the same time, multiplexer 410 is switched so that its output now comes from the new memory instead of the old. A signal is also inserted in the aggregate data stream being transmitted to the remote station commanding that station to switch to the new frame as well. As a result of this process, the switchover from old frame to new can be made without interruption of data transmission and without the loss of any data.

Figure 4A:
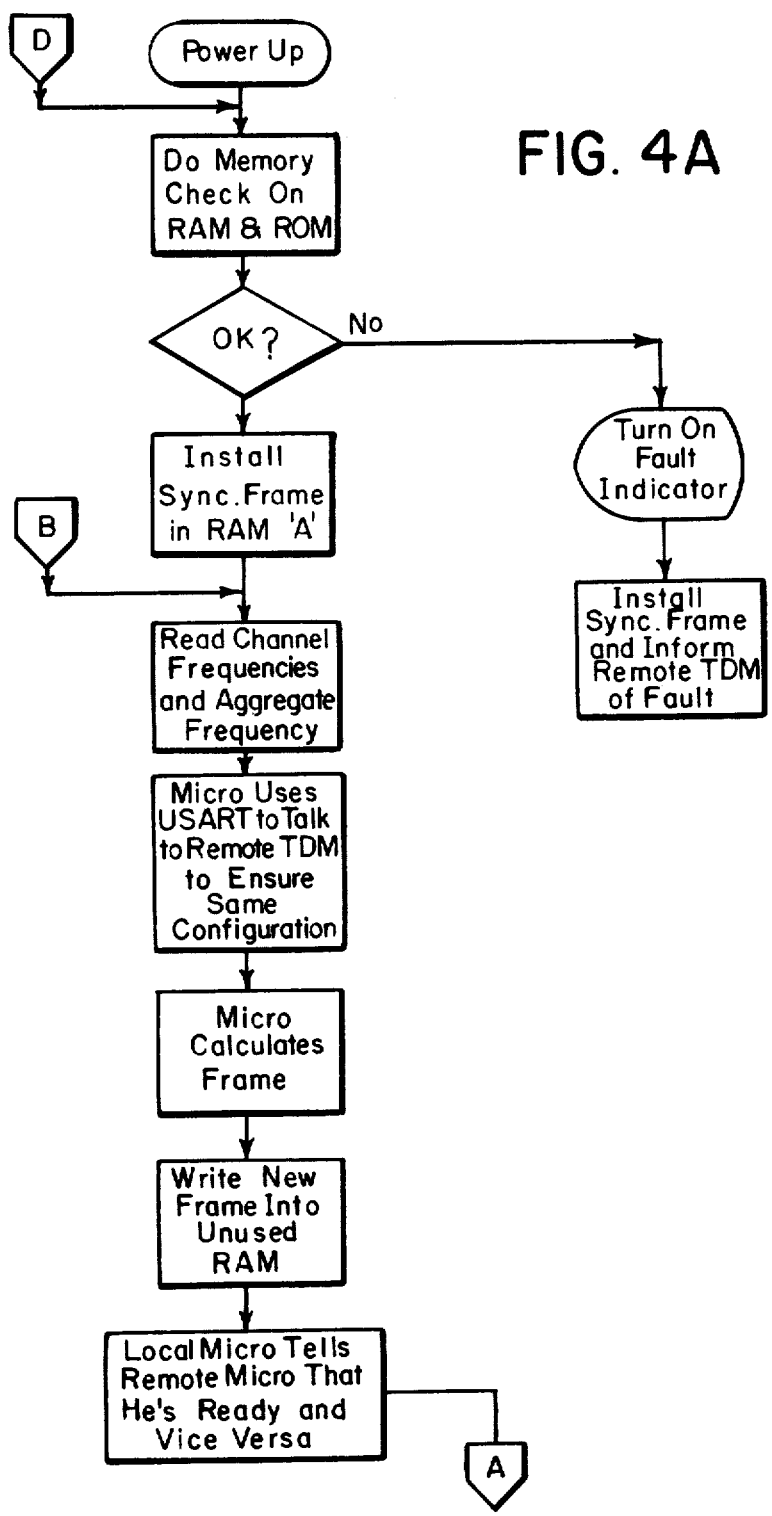
Figure 4C:
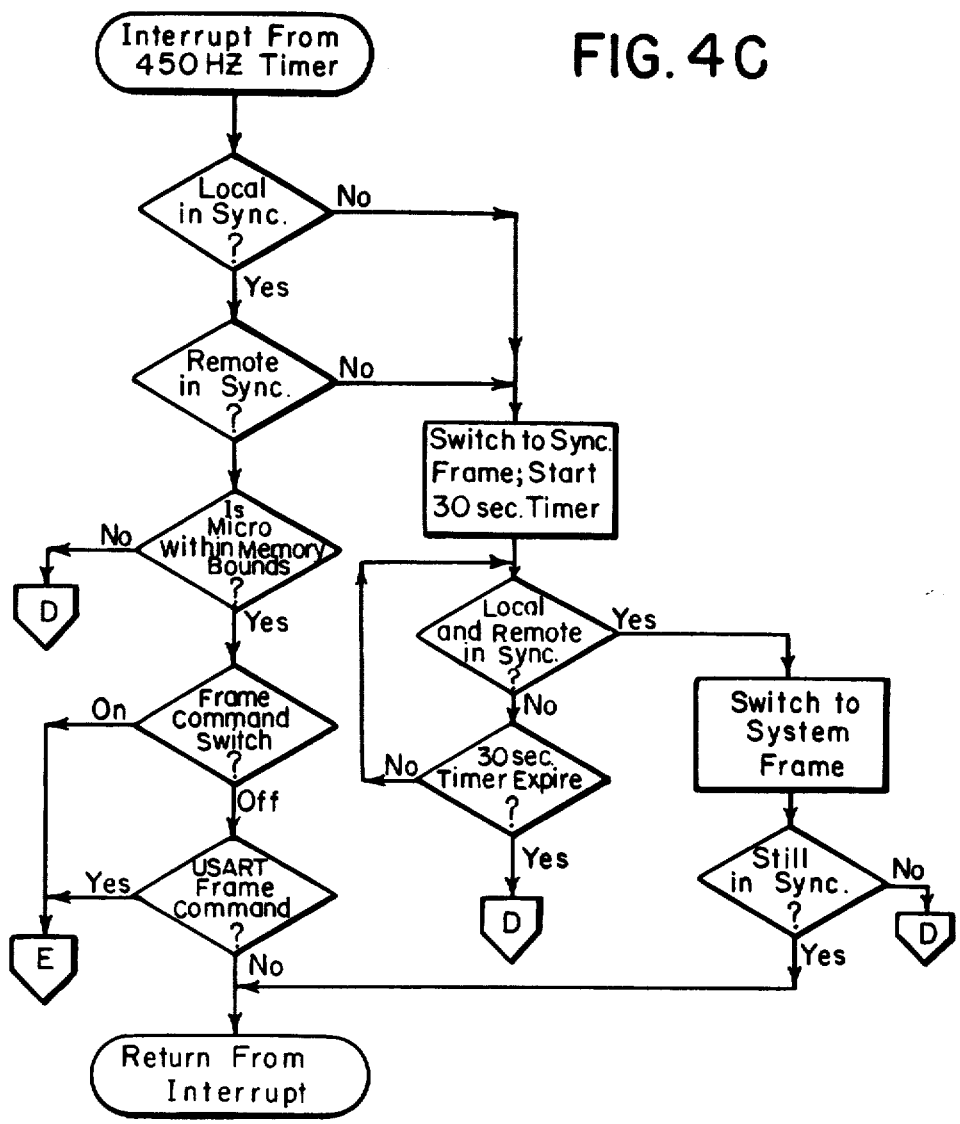

A flow chart depicting the general operation of the microprocessor is depicted in FIGS. 4A, 4B and 4C. As shown in FIG. 4A, upon receiving power the microprocessor performs a memory check on its random access memory and read only memory. If there is a fault it turns on a fault indicator, establishes synchronization with the remote TDM transmitter/receiver and informs the remote TDM station of the fault. If there is no fault, the microprocessor reads into the random access memory the signals representative of a synchronization frame and then causes multiplexer 360 to address this memory so as to generate the synchronization frame signals. Further details concerning a synchronization frame are set forth in the above referenced patent application, "Method and Apparatus for Establishing Frame Synchronization".

While the synchronization frame is being transmitted, the microprocessor addresses the individual data channels and the aggregate channel to obtain the transmit and receive clock signals of these channels and from these signals calculates their frequencies. While these signals are being read and these calculations performed at the local station, the same process is being performed at the remote station. Once the local station has calculated the individual data and aggregate channel transmit and receive frequencies, this information is compared with the information calculated by the remote station in order to ensure that both the local and the remote stations are operating under the same configuration.

Next, the local microcomputer calculates the frame required to accommodate the channel frequencies. It then checks this frame to make sure that it is capable of handling the data to be transmitted. If the frame is adequate it is then written into the random access memory of that unit which is not being used to generate channel select and overhead signals at that time. At the same time, this process is also being performed by the microcomputer at the remote station. Once the new frame is written into the unused memory unit, the local microcomputer informs the remote microcomputer that it is ready to switch to the new frame. In return, the remote microcomputer indicates when it is ready. When both microcomputers have indicated that they are ready, the local microprocessor enables the multiplexer 360 or 365 in the memory unit in which the new frame is stored and switches multiplexer 410 so that its output comes from that memory unit. At the same time, the local microcomputer signals the remote microcomputer to switch to the new frame.

Thereafter the microprocessor's role is one of monitoring the TDM receiver/transmitter for changes in operating conditions and for commands for such changes. One source of commands is the remote station which communicates with the local microcomputer via USART 200. These commands are of two types, one of which requires a reconfiguration of the frame and the other of which requires notification of the status of the local station. Reconfiguration can also be requested at the local station by means of a frame command switch. In either case, if reconfiguration is requested, the remote microprocessor is advised of this and the microcomputer begins again at point B on the flow chart of FIG. 4A to determine the channel frequencies and to calculate a new frame.

Another type of change is a request for display. If this request relates to the status of the local station, this information is read and displayed on local CRT display 290. If it is a request for display of the status of the remote terminal, a command is sent to the remote station seeking such information; and when this information is received therefrom it is displayed on the local CRT. Other types of display commands relate to the local monitor. When such commands are present, alarms are displayed on the CRT; and these displays continue in the absence of an exit command.

Under control of a 450 Hz timer the microcomputer also tests once every 2.2 milliseconds for synchronization. As indicated in FIG. 4C, it tests if the local station is in synchronization with the remote station and whether the remote station is in synchronization with the local station. In addition, it tests if the microcomputer is within its memory bounds. It also checks if the local frame command switch is ON or OFF and if a frame command has been received from the remote station. If there is a failure in synchronization, the local microcomputer transmits the synchronization frame and starts a 30 second timer. If the timer expires without establishing synchronization, operation returns to point D on the flow chart of FIG. 4A and commences with a memory check on RAM 140 and ROM 150. If synchronization is achieved within 30 seconds, the system is then switched to its current frame configuration and tested to determine if it is still in synchronization. If it is not, the microcomputer returns to point D on the flow chart of FIG. 4A. If synchronization is achieved then the testing process is complete. If the microcomputer is not within memory bounds, operation returns to point D on the flow chart of FIG. 4A and if the frame command switch is ON or a frame command has been received from the remote station, operation continues at point E of FIG. 4B.

The channel frequencies used in calculating the frame are determined by frequency counter 180 which preferably is a Motorola 6840 timer chip. As indicated above, the individual channels may be addressed by latch 230, decoder 240, 245, buffers 250, 255 and multiplexer 262. As a result of such addressing several channel status and clocking signals are made available to the microprocessor including the channel transmit and receive clock signals, which are of interest to the present invention. The transmit or receive clock signals from the addressed channel are applied through latch 270 and multiplexer 280 to frequency counter or measurer 180. In particular, this signal is applied to the $\overline{C3}$ clock input of the 6840 timer chip. A high speed clock having frequency of 921.6 KHz is applied to the enable input of this chip. With these inputs the chip counts cycles of the high speed clock from one leading edge of the channel clock signal to the next. This count is read from the chip by the microprocessor which uses the count to calculate the actual frequency of the clock signal. The microprocessor then tries to match this value with a table of valid channel frequencies. If a match is made, the information is stored in a table of values representative of the transmit and receive frequencies of the individual data channels and the aggregate channel. If it is unable to make a match, the microprocessor ignores this channel in the calculation of the frame and alerts the operator to the discrepancy between the measured channel frequency and what it was expected to be. The provides a quick means of identifying one source of errors in a TDM system, thereby reducing down time.

This process continues for each channel and the aggregate channel. Once these frequencies are determined and this information is compared with the remote station, the microprocessor is ready to calculate a new frame.

To calculate a new frame the microprocessor begins by sorting the channel rates and ordering them so that the highest rate is first. The possible channel clock rates (cycles/second) that may be used in an illustrative embodiment of the present invention are set forth in Table 1. The asynchronous channel clock rates of 1759 and 2153 will be recognized as corresponding to data rates of 110 bits/second and 134.5 bits/second. For purposes of calculating the frame, these rates are assumed to be 125 bits/second and 150 bits/second.

TABLE 1

| | |
|---|---|
| 50 | 16000 |
| 75 | 19200 |
| 100 | 24000 |
| 150 | 28800 |
| 200 | 32000 |
| 300 | 38400 |
| 400 | 40800 |
| 600 | 48000 |
| 800 | 50000 |
| 900 | 56000 |
| 1000 | 57600 |
| 1200 | 64000 |
| 1600 | 72000 |
| 1759 | 76800 |
| 1800 | 100000 |
| 2000 | 112000 |
| 2153 | 115200 |
| 2400 | 128000 |
| 3200 | 144000 |
| 3600 | 153600 |
| 4000 | 192000 |
| 4800 | 224000 |

TABLE 1-continued

| | |
|---|---|
| 6400 | 230400 |
| 7200 | 256000 |
| 8000 | 288000 |
| 9600 | 1152000 |
| 12000 | 1544000 |
| 14400 | 2048000 |
| | 2304000 |

Once the channel rates are ordered, the microprocessor determines the greatest common denominator (i.e., greatest common factor or divisor) of the channel rates. This number establishes the number of frames that are transmitted per second and is called the frame rate. In the preferred embodiment of the invention this number can not be greater than 50 or less than 5. This upper bound is set so as to minimize the amount of channel capacity that is lost by the transmission of overhead signals in each frame. The lower bound is set because certain communication signaling, such as a determination that the local and remote stations are out of sync, requires the reception of multiple frames. As a result, the lower the frame rate, the longer it takes to detect a condition such as out of sync.

Once the frame rate is chosen the total of the individual data channel rates is subtracted from the aggregate rate to determine the number of channel selects that are available for purposes such as the transmission of control signals, synchronization signals and other overhead. If there are not enough channel selects available to accommodate this overhead, one of the individual data channels must be dropped from the frame and another attempt made to determine the frame rate and the availability of enough additional channel selects to accommodate the overhead. Illustratively the channel with the highest data rate is dropped in such a case.

Next, the number of total selects required per frame is calculated by dividing the aggregate channel rate by the frame rate; and the number of subframes required is determined by dividing the number of total selects per frame by 512. The number 512 is the maximum number of selects available in a subframe for the counter 350 shown in the apparatus of FIG. 3. Obviously, a different maximum would be available for a counter with a different capacity.

The number of channel selects per frame is then calculated for each channel by dividing the clock rate of that channel by the frame rate. Next, the number of channel selects used for each channel in the subframe is calculated by dividing the number of selects per frame for that channel by the number of subframes. This number is accumulated for each of the channels and after it has been calculated for all the channels it is compared with the number 512. If the accumulated number exceeds 512, the number of subframes to be used is incremented by one and the process of calculating the number of selects in the repeating portion of the memory is repeated.

Once the total number of selects is less than 512 the process begins of distributing channel selects to the random access memory. For each channel a ratio is determined of the number of selects in the subframe to the total size of the subframe. Then, beginning with the channel with the largest ratio, channel select signals are assigned to individual memory addresses. Numerous techniques are available for making such an assignment. In one such technique, the microprocessor establishes an array which associates memory addresses and channel selects. Then, starting with the channel having the highest data transmission rate, for each channel the microprocessor steps through the memory one address at a time testing if a channel select is already stored in that address and if it is time to store a channel select at that address. If there is already a channel select signal stored at that address, the microprocessor goes to the next address. At the first memory address which is empty, the microprocessor stores the channel select signal for the channel and initializes a counter which accumulates the total number of channel select signals that is stored for that channel. At each subsequent memory address, the microprocessor divides the number of select signals it has stored by the number of the memory address, the first memory address being defined as zero. If this quotient is less than the ratio of the number of channel selects for that channel in the subframe to the total size of the subframe, then it is time to store another channel select in the memory; and the microprocessor writes the appropriate channel select signal into the random access memory at that address. This process continues until all the channel selects for the highest speed channel are written, whereupon the microprocessor moves on to the next highest speed channel and so on until all the channel selects for the data channels are written. In accordance with the invention described in the above referenced "Method and Apparatus for Distributing Control Signals", any remaining time slots in the frame are preferably allocated to the transmission of control signals from the individual channels.

If there are any remaining channel selects required to satisfy the data transmission requirements of the individual data channels, these selects are then distributed in the same fashion throughout the non-repeating portion of the frame. Overhead signals such as the frame sync word are then inserted in the remainder of the non-repeating portion of the frame. Alternatively, the frame sync word and other overhead signals may be distributed through the frame in accordance with the invention described in the above referenced "Method and Apparatus for Overhead Signaling". Finally, the end of subframe signal is inserted at the last address in the repeating RAM and the end of frame signal is inserted in the last address in the nonrepeating RAM.

The frame is then checked to make sure that the distribution of channel select signals is uniform enough that the individual channel buffers on the transmitting side of the system will not overflow before data is read out of these buffers for transmission to a remote station. The frame is also checked to make sure that the individual channel buffers on the receiving side of the system will not underflow when data is being read out of them into the individual channels. If an underflow or overflow condition is identified, a new frame distribution is calculated.

Further details concerning the calculation of the frame will be apparent to those skilled in the art from the program listing which is furnished as an appendix to this application. The listing is designed to run on a Motorola 6809 microprocessor and the definition of the source codes will be familiar to those having knowledge of such microprocessor.

What is claimed is:

1. In a bit-interleaved time division multiplexer for multiplexing data and control signals from a plurality of individual data channels so as to produce a single stream of signals on an aggregate transmission line, said multiplexer including a frame generator which generates select signals that are used to select for transmission in a frame either data from individual data channels or overhead signals, apparatus for automatically generating the select signals for said frame comprising:
   a microprocessor,
   a random access memory in which are stored the select signals of the frame and from which said select signals are read by said microprocessor to generate the frame,
   means for measuring the data transmission rates of each individual data channel,
   means for storing a computer program for calculating with the microprocessor the number of frames transmitted per unit time and the distribution of the select signals in the frame in accordance with the data transmission rates of the individual data channels and the aggregate transmission line,
   means for storing in said random access memory the select signals of the frame in accordance with the distribution calculated by said microprocessor, and
   means for reading out of said random access memory the select signals stored therein in order to generate said frame.

2. The apparatus of claim 1 further comprising a second random access memory in which can also be stored the select signals of the frame and from which said select signals can be read and means for switching the frame generation function from one random access memory to the other, whereby while one memory is being used to generate a frame the other memory is written with select signals to generate a different frame and when said writing operation is completed the frame generation function is passed to said other memory.

3. In a time division multiplexer for multiplexing data and control signals from a plurality of individual data channels so as to produce a single stream of signals on an aggregate transmission line, said multiplexer including a frame generator which generates select signals that are used to select for transmission in a frame either data from individual data channels or overhead signals, apparatus for generating said frame comprising:
   first and second random access memories in each of which are stored the select signals for the frame and from which said select signals are read to generate the frame,
   means for reading said select signals from said random access memories,
   means for writing into one of said random access memories the select signals for a frame while the select signals in the other of said memories are being read out to generate a frame, and
   means for switching the frame generation function from one memory to the other, whereby while one memory is being used to generate the frame the other memory is written with select signals to generate a different frame and when said writing operation is completed the frame generation function is passed to the other memory.

4. The apparatus of claim 2 or claim 3 further comprising means for switching the frame generation function from one memory to the other at such a point that no data is lost during switchover.

5. The apparatus of claim 2 or claim 3 further comprising means for detecting the end of a frame and for switching the frame generation function before the next frame commences.

6. In a time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals, apparatus for detecting errors in the data transmission rates of said channels comprising:

a microprocessor, a random access memory in which are stored the select signals of the frame and from which said select signals are read by said microprocessor to generate the frame, means for measuring the data transmission rates of each individual data channel, and means for comparing said data transmission rates with a set of allowable data transmission rates and for indentifying any discrepancy to an operator.

7. In a time division multiplexer for multiplexing data and control signals from a plurality of individual data channels so as to produce a single stream of signals on an aggregate data transmission line, said multiplexer including a frame generator which generates select signals that are used to select for transmission in a frame either data from individual data channels or overhead signals, a machine-implemented method of automatically generating the select signals for the frame comprising the steps of:

determining the data transmission rates of the individual data channels and the aggregate transmission line, determining a common denominator of said data transmission rates, said common denominator constituting a frame rate, determining the total number of select signals to be used per frame by dividing the data transmission rate of said aggregate data transmission line by the frame rate, determining the number of select signals to be used per frame for each data channel by dividing the data transmission rate for that channel by the frame rate, storing the select signals in a random access memory such that the select signals for each channel are relatively uniformly distributed throughout the addresses of said memory, and reading out of said random access memory the select signals stored therein to generate said frame.

8. In a time division multiplexer for multiplexing data and control signals from a plurality of individual data channels so as to produce a single stream of signals on an aggregate data transmission line, said multiplexer including a frame generator which generates select signals that are used to select for transmission in a frame either data from individual data channels or overhead signals, apparatus for automatically generating the select signals for the frame comprising:

a random access memory, means for measuring the data transmission rates of the individual data channels and the aggregate data transmission line, means for determining a common denominator of said data transmission rates, said common denominator constituting a frame rate, means for determining the total number of select signals to be used per frame by dividing the data transmission rate of said aggregate data transmission line by the frame rate, means for determining the number of select signals to be used per frame for each data channel by dividing the data transmission rate for that channel by the frame rate, means for storing the select signals in said random access memory such that the select signals for each channel are relatively uniformly distributed throughout the frame, and means for reading out of said random access memory the select signals stored therein to generate said frame.

9. In a time division multiplexer for multiplexing data and control signals from a plurality of individual data channels so as to produce a single stream of signals on an aggregate transmission line, said multiplexer including a frame generator which generates select signals that are used to select for transmission in a frame either data from individual data channels or overhead signals, a method for generating said select signals comprising the steps of:

writing into one of first and second random access memories the select signals for a frame;

while select signals are being written into one of said first and second random access memories, reading from the other of said first and second random access memories select signals previously written therein and using the select signals read from said other memory to select data or overhead signals for transmission; and switching the frame generation function from one memory to the other, whereby while one memory is being used to generate the frame the other memory is written with select signals to generate a different frame and when said writing operation is completed the frame generation function is passed to the other memory.

10. The method of claim 9 further comprising the step of switching the frame generation function from one memory to the other at such a point that no data is lost during switchover.

11. The apparatus of claim 9 or claim 10 further comprising the steps of detecting the end of a frame and switching the frame generation function before the next frame commences.

12. In a time division multiplexer for multiplexing data and control signals from a plurality of individual data channels so as to produce a single stream of signals on an aggregate data transmission line, said multiplexer including a frame generator which generates select signals that are used to select for transmission in a frame either data from individual data channels or overhead signals, a machine-implemented method of automatically generating the select signals for the frame comprising the steps of:

measuring the data transmission rates of the individual data channels, determining a frame rate from the data transmission rates of the individual data channels and the aggregate data transmission line, determining the total number of select signals to be used per frame by dividing the data transmission rate of said aggregate data transmission line by the frame rate, determining the number of select signals to be used per frame for each data channel by dividing the data transmission rate for that channel by the frame rate, storing the select signals in a random access memory such that the select signals for each channel are relatively uniformly distributed throughout the frame, and reading out of said random access memory the select signals stored therein to generate said frame.

13. The method of claim 12 wherein the frame rate is between 5 and 50 frames per second.

14. In a time division multiplexer for multiplexing data and control signals from a plurality of individual data channels so as to produce a single stream of signals on an aggregate data transmission line, said multiplexer including a frame generator which generates select signals that are used to select for transmission in a frame either data from individual data channels or overhead signals, apparatus for automatically generating the select signals for the frame comprising:

a random access memory, means for measuring the data transmission rates of the individual data channels, means for determining a frame rate from the data transmission rates of the individual data channels and the aggregate data transmission line, means for determining the total number of select signals to be used per frame by dividing the data transmission rate of said aggregate data transmission line by the frame rate, means for determining the number of select signals to be used per frame for each data channel by dividing the data transmission rate for that channel by the frame rate, means for storing the select signals in said random access memory such that the select signals for each channel are relatively uniformly distributed throughout the frame, and means for reading out of said random access memory the select signals stored therein in order to generate said frame.

15. The apparatus of claim 14 wherein the frame rate is between 5 and 50 frames per second.

* * * * *